Feb. 23, 1943.                G. W. BROWN                2,312,024
                        INSULATED ELECTRIC CONDUCTOR
                           Filed Nov. 20, 1937
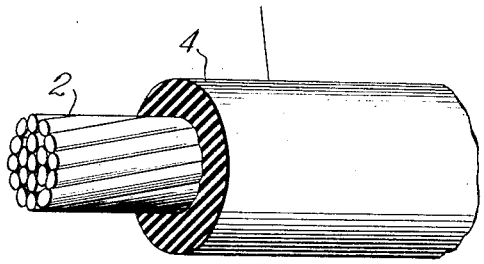
INVENTOR
Grover W. Brown
BY
Liddle, Bethell and Montgomery
ATTORNEYS Patented Feb. 23, 1943

2,312,024

UNITED STATES PATENT OFFICE 2,312,024

INSULATED ELECTRIC CONDUCTOR

Grover W. Brown, Fair Lawn, N. J., assignor to The Okonite Company, Passaic, N. J., a corporation of New Jersey Application November 20, 1937, Serial No. 175,628

5 Claims. (Cl. 174—125)

My invention relates to insulated electric conductors either of the single or multi-conductor type, and has for an object the provision of an electric conductor insulated with a novel composition possessing improved electrical, physical and chemical properties. I might say that one highly desirable property possessed by my improved insulation is resistance to attack by ozone, a phenomenon which has always given considerable trouble with high voltage rubber insulated cables.

Rubber and rubber-like insulating compounds for electric conductors possess a great number of different properties, and I might state that in general the improvement in one direction, particularly in dielectric properties, is usually accomplished at the expense of other desirable properties. For example, resistance to ozone and high dielectric strength are properties of certain oil-base rubber compounds, but these compounds are seldom, if ever, as high in insulation resistance or as low in specific inductive capacity and dielectric loss as other compounds poor in their resistance to ozone. In general, low capacity, high insulation resistance and low dielectric loss are obtained in rich rubber compounds which are not resistant to ozone.

I have found that the insulation of conductors insulated in accordance with the present invention is high in dielectric strength, highly resistant to the action of acids, alkalies, heat and moisture and possesses good physical properties such as aging, tensile strength, firmness, etc. I have found also that proper proportioning of the ingredients of the compound yields a material which is ozone-proof.

The compound employed in the practice of my invention may be applied to the conductor by the extrusion process or by the strip process employed in insulating conductors with rubber compounds, and if vulcanization is desired this may be accomplished by the usual methods employed in vulcanizing rubber insulated conductors.

More specifically the present invention is directed to the production of an electric conductor insulated with a compound or mixture comprising rubber and polymerized isobutylene, this compound being mechanically mixed and applied to the conductor, as above mentioned, by extrusion or by the strip process or by any other suitable process.

The rubber employed in the insulating compound or mixture may be any natural or synthetic rubber or rubber-like electrical insulating compositions, and wherever the expression "rubber" is herein employed the same is to be interpreted as covering any or all of said materials.

The polymer employed in the insulating compound has a high molecular weight, say from 30,000 upwards, as determined by the Staudinger viscosity method, and while the method of preparing the polymer constitutes no part of this invention a brief description of one method of its preparation will be given for the sake of clarity of description.

The high molecular weight polymer employed in this invention may be prepared by polymerizing isobutylene in the presence of a volatile inorganic halide such as boron fluoride at very low temperature such as —50° C. or even as low as —100° C. Polymerization is preferably carried out in the presence of a suitable solvent for the isobutylene such as a purified ethylene or other low-boiling liquefied gaseous hydrocarbon. Both the isobutylene and the catalyst boron fluoride must be substantially pure, and it is particularly important that the starting materials be free of sulfur compounds and other substances which act as poisons to the polymerization of the isobutylene. After polymerization has been completed, the pressure is released and the temperature allowed to rise to room temperature. The product is washed or otherwise purified until it contains less than 0.1% and preferably less than .01% of inorganic salt.

If desired the polymerized product may be separated into fractions having different molecular weights, either by selective extraction or solution and selective precipitation, using solvents such as ethane, propane, naphtha, benzol, acetone-benzol, etc. at the proper temperature to effect the desired separation.

Materials other than boron fluoride may be used as a catalyst—for example, aluminum plus hydrogen chloride, phosphorous trifluoride, phosphorous pentafluoride, or other volatile inorganic halides.

In compounding, the rubber and polymer are mechanically mixed, the rubber is worked on an ordinary rubber mill, the fillers, activators, vulcanizing ingredients, accelerators, etc. being added at this stage. After thorough milling the polymer is added to the mixture and milling continued until the rubber and polymer have been thoroughly intermixed. The compound may then be applied to the conductor to be insulated by extrusion by the strip process, or any other suitable process employed in insulating conductors with rubber compounds.

The conductor to be insulated may be solid, stranded or braided, and it will be understood the invention is equally applicable to single and multi-conductors.

I have found that the ratio of polymer to rubber varies over a wide range and depends to a large extent upon the properties desired in the finished article. I have found also that the molecular weight of the polymer employed varies over a wide range and the particular weight chosen depends a great deal upon the characteristics desired in the finished product. So far as the electrical properties of the finished product are concerned, I find for instance that they improve almost in direct proportion to the amount of polymer added, while so far as the physical properties of the finished product are concerned I have found, for example, that the tensile strength improves with increase in molecular weight and that surface migration of the polymer in the compound decreases with increase in molecular weight.

Owing to the range over which the quantity of polymer used as well as the molecular weight of the polymer may be varied, it is difficult to fix upon upper and lower limits so far as either of these factors is concerned. I might say, however, that a molecular weight of 30,000 appears to be about the minimum so far as this factor is concerned, while the limits so far as proportion of polymer employed depends upon the physical and electrical characteristics desired in the finished product. For ozone-proof insulation the amount of polymer employed should be in excess of the rubber. I have obtained excellent results employing a ratio of about five to three.

Examples of rubber-polymer compounds which I have found suitable for my purpose are:

|  | Example, parts by weight | |
|---|---|---|
|  | 1 | 2 |
| Rubber | 24 | 30 |
| Polymerized isobutylene (80,000 m. wt.) | 32 | 48 |
| Whiting | 20 | 7 |
| Zinc oxide | 5 | 5 |
| Clay | 15 |  |
| Small amounts of special vulcanizing ingredients, accelerators, etc. | | |

These sample compounds were found to have the following electrical properties:

|  | Example | |
|---|---|---|
|  | 1 | 2 |
| 60 cycle power factor | 1.76 | 0.46 |
| Specific inductive capacity | 3.33 | 2.70 |
| Resistivity in ohms per cm. cube | 66×(10)$^{14}$ | 83×(10)$^{14}$ |

I have found in compounding the rubber and the isobutylene polymer that apparently the polymer surrounds the rubber particles of the compound and hence any free sulfur in the compound would dissolve in the rubber during the process of vulcanization and be removed from the polymerized isobutylene so that there will be small chance of any free sulfur coming in contact with the conductor. This is of particular advantage inasmuch as the free sulfur in the presence of moisture generates sulfuric acid which, reacting with the bare copper to produce copper salts, has a deleterious effect on the rubber insulation causing its rapid oxidation and subsequent destruction. Should any free sulfur come in contact with the copper conductor using this material of my invention, any copper salts formed could not come in contact with the rubber insulating material since the isobutylene polymer is interposed between the copper conductor and the rubber particles and itself is not affected by the presence of copper salts.

I have found that my improved insulating compound possesses very desirable physical as well as electrical properties in that it is high in tensile strength and resistance to ozone, high in insulation resistance and dielectric strength, and low in dielectric loss and specific inductive capacity. I am aware that the insulation of prior insulated conductors has possessed some of these characteristics, but none has possessed them all.

An insulated conductor made in accordance with the invention is shown in the accompanying drawing, in which 2 is the conductor and 4 the insulation made of the compound above referred to.

The present invention is not to be limited to the specific examples given inasmuch as the same may be varied within wide limits as above set out without departing from the spirit and scope of my invention.

What I claim is:

1. An electrical conductor insulated with a compound comprising an initially flexible rubber mechanically mixed with an isobutylene polymer having a molecular weight not less than 30,000 with the polymer in excess.

2. An electrical conductor insulated with a compound comprising an initially flexible rubber mechanically mixed with an isobutylene polymer having a molecular weight of about 80,000, with the polymer in excess.

3. An electrical conductor insulated with a compound comprising an initially flexible rubber, 24 parts by weight, and an isobutylene polymer, 32 parts by weight, the rubber and polymer being mechanically mixed, and the polymer having a molecular weight not less than 30,000.

4. An electrical conductor insulated with a compound comprising an initially flexible rubber mechanically mixed with an isobutylene polymer having a molecular weight above 30,000 in the ratio of about 5 parts by weight of polymer to 3 parts by weight of rubber.

5. An electrical conductor insulated with an ozone-proof compound comprising an initially flexible rubber mechanically mixed with an isobutylene polymer in the ratio of about 5 parts by weight of polymer to 3 parts by weight of rubber, the polymer having a molecular weight not less than 30,000.

GROVER W. BROWN.